United States Patent
Schenkelman et al.

(10) Patent No.: US 12,443,741 B2
(45) Date of Patent: Oct. 14, 2025

(54) FINE-GRAINED AUTHORIZATION AS A SERVICE VIA RELATIONSHIP-BASED ACCESS CONTROL WITHIN A MULTI-TENANT SYSTEM

(71) Applicant: Okta, Inc., San Francisco, CA (US)

(72) Inventors: Damian Ezequiel Schenkelman, Buenos Aires (AR); Jonathan Cornelius Allie, Newton, NC (US); Yamil Asusta, San Juan, PR (US); Javier Alberto Centurion, Buenos Aires (AR); Raghd Hamzeh, Toronto (CA); Sebastian Iacomuzzi, London (GB); Matias Adrian Woloski, Maldonado (UY)

(*) Notice: Subject to any disclaimer, the term of this patent is extended or adjusted under 35 U.S.C. 154(b) by 273 days.

(21) Appl. No.: 17/733,644

(22) Filed: Apr. 29, 2022

(65) Prior Publication Data
US 2023/0351039 A1 Nov. 2, 2023

(51) Int. Cl.
*G06F 21/62* (2013.01)
*G06F 21/31* (2013.01)
(Continued)

(52) U.S. Cl.
CPC .......... *G06F 21/6227* (2013.01); *G06F 21/31* (2013.01); *G06F 21/604* (2013.01); *G06N 5/04* (2013.01)

(58) Field of Classification Search
None
See application file for complete search history.

(56) References Cited

U.S. PATENT DOCUMENTS 9,774,586 B1 * 9/2017 Roche .................. H04L 63/08
11,190,548 B1 * 11/2021 Liu ...................... H04L 63/20
(Continued)

OTHER PUBLICATIONS

Gruchalski, Radek, "RBAC with Ory Keto", May 15, 2021 updated May 17, 2021, 16 pages <https://gruchalski.com/posts/2021-05-15-rbac-with-ory-keto/> (Year: 2021).*
(Continued)

*Primary Examiner* — Michael Pyzocha
(74) *Attorney, Agent, or Firm* — Holland & Hart LLP (57) ABSTRACT

An authorization system provides authorization services for multiple tenant organizations. The authorization is performed based on standardized data types—an authorization model, and relationship tuples—that are applicable across the different organizations. Each organization wishing to use the system for authorization specifies its own authorization model(s) (representing the types of objects that can exist within the organization, and which types of relations those objects can have) and relationship tuples (representing the existing user/object relationships within the organization). When a given organization submits an authorization query to determine whether a given user and a given object are in a given type of relation within that organization (e.g., whether the user can perform a particular action on the object), the system analyzes the authorization model and relationship tuples to make the determination. Query response latency may be reduced through techniques such as geographic distribution of servers and sharding of data so that the data for a given query can be found within the same shard.

12 Claims, 2 Drawing Sheets

(51) Int. Cl.
  *G06F 21/60*   (2013.01)
  *G06N 5/04*    (2023.01)

(56) References Cited

U.S. PATENT DOCUMENTS

| | | | | |
|---|---|---|---|---|
| 11,315,041 | B1* | 4/2022 | Jain | G06N 20/20 |
| 11,962,663 | B1* | 4/2024 | Threlkeld | G06F 9/542 |
| 2010/0257579 | A1* | 10/2010 | Karjoth | G06F 21/6227 |
| | | | | 726/1 |
| 2010/0299738 | A1* | 11/2010 | Wahl | G06F 21/33 |
| | | | | 713/170 |
| 2011/0302622 | A1* | 12/2011 | Bregman | G06F 21/6218 |
| | | | | 726/1 |
| 2016/0315965 | A1* | 10/2016 | Sastry | H04L 63/105 |
| 2019/0384929 | A1* | 12/2019 | Noe | G06F 21/604 |
| 2020/0120098 | A1* | 4/2020 | Berg | H04L 63/104 |
| 2022/0224535 | A1* | 7/2022 | Coffing | H04L 63/102 |
| 2022/0229928 | A1* | 7/2022 | Shachar | G06F 16/248 |
| 2023/0006880 | A1* | 1/2023 | Kaufman | H04L 41/0816 |
| 2023/0110527 | A1* | 4/2023 | Bhat | H04L 63/102 |
| | | | | 726/4 |
| 2023/0351039 | A1* | 11/2023 | Schenkelman | G06F 21/604 |
| 2024/0193249 | A1* | 6/2024 | Li | G06F 21/44 |

OTHER PUBLICATIONS

Gruchalski, Radek, "Looking at Zanzibar through Ory Keto", May 5, 2021, 13 pages <https://www.ory.sh/looking-at-keto/> (Year: 2021).*

Kraus, Vincent, "The Evolution of Ory Keto: A Global Scale Authorization System", Apr. 26, 2021, 10 pages <https://www.ory.sh/keto-zanzibar-evolution/> (Year: 2021).*

"International Search Report and Written Opinion of the International Searching Authority," issued in connection with Int'l Appl. No. PCT/US2023/020390, dated Aug. 2, 2023 (10 pages).

Madani, M. A., et al., "Access control in a collaborative session in multi tenant environment", 2015 11th International Conference on Information Assurance and Security (IAS), Dec. 14, 2015, pp. 1-6.

Tang Bo: "Multi-Tenant Access Control For Cloud Services", Dissertation, Apr. 1, 2014, pp. 1-112.

Pang, R. et al., "Zanzibar: Google's Consistent, Global Authorization System," Proc. of 2019 USENIX Annual Technical Conference (USENIX ATC '19), Jul. 2019, pp. 1-14.

* cited by examiner

FINE-GRAINED AUTHORIZATION AS A SERVICE VIA RELATIONSHIP-BASED ACCESS CONTROL WITHIN A MULTI-TENANT SYSTEM

FIELD OF ART

This disclosure relates generally to the field of software systems, and more specifically, to systems for determining authorization for users and objects within a multi-tenant system.

BACKGROUND

Authorization processes determine whether a user is permitted to perform a given action on an object. Authorization logic is traditionally hand-coded for each individual application or system for which authorization is desired and logic to make authorization decisions typically shares both code and data stores with the rest of the application's logic, which is time-consuming and error-prone, and not portable across different systems.

SUMMARY

An authorization system provides authorization services for multiple tenants/organizations. The authorization is performed based on standardized data types—an authorization model, and relationship tuples—that are applicable across the different organizations. Each organization wishing to use the system for authorization, creates one or more tenants. In each tenant, they specify its own authorization model(s) (representing the types of objects that can exist within the organization's system, and which types of relations those objects can have to users and to each other) and relationship tuples (representing the existing user/object and object/object relationships within the organization's system). When a given organization submits an authorization query to determine whether a given user and a given object have a given type of relation within that organization (e.g., whether the user can perform a particular action on the object), the system analyzes the authorization model and relationship tuples, making inferences according to rules of the authorization model to determine whether the relation exists between the user and the object.

In some embodiments, the authorization models are specified using a domain-specific language (DSL) that uses Boolean operators such as "or" disjunctions to specify which types of relations imply which other types of relations. The DSL simplifies the task of defining authorization models within a given domain, easing burdens on users of the authorization system to specify those relationships.

In some embodiments, an organization may use multiple authorization models (e.g. different versions of a particular domain model), and the authorization system may compare query outcomes using the identifiers of the different authorization models as input, for purposes such as phased rollout/rollback of authorization logic.

The various relationship tuples may be created by software designed to be compatible with the authorization system, e.g., in response to actions by the various users, such as document creation, the specification of user membership within a particular user group, and the like. In some embodiments, the relationship tuples are distributed across database shards such that the data needed to evaluate any given database query required to respond to an authorization query is available within a single shard, thereby improving computational parallelism and decreasing query processing time.

In some embodiments, the DSL may specify conditions under which a given user of an organization's system (as opposed to a user of the authorization system itself) may be permitted to create relationship tuples. For example, a particular organization may use the DSL to specify that one of the organization's users with a certain relation to an object is permitted to create other relationship tuples pertaining to that object.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

DETAILED DESCRIPTION

Figure 1:
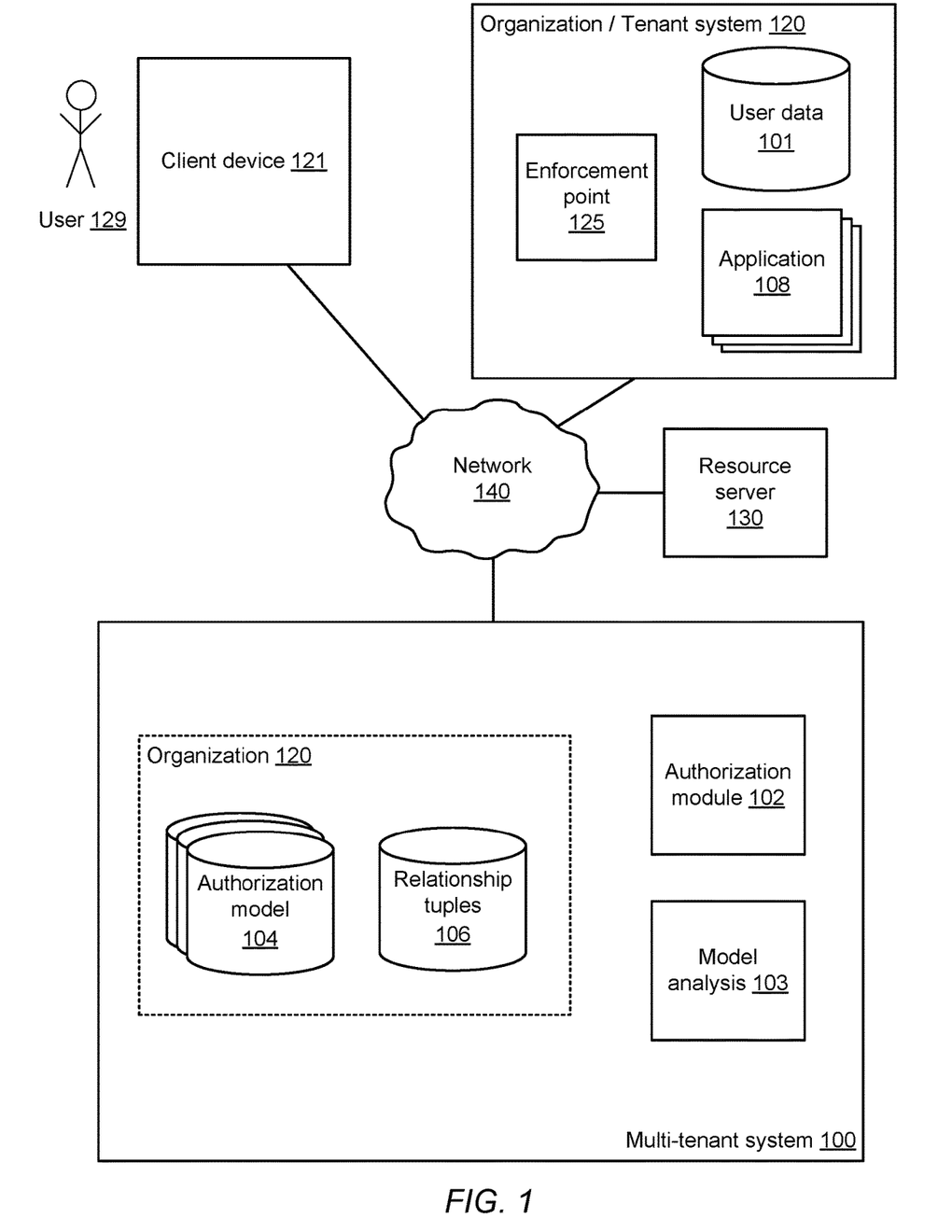
FIG. 1 illustrates an environment in which various distinct organizations use a multi-tenant system to determine whether particular actions of particular users are authorized for that organization, according to one embodiment.

FIG. 1 illustrates an environment in which various distinct organizations use a multi-tenant system to determine whether particular actions of particular users are authorized for that organization, according to one embodiment. Each organization 120 provides applications 108. Applications 108 are used by a number of client devices 110 used by different users 129 of the organization (e.g., if the application is a document authoring application, users of the application could be direct consumers, as in a business-to-consumer ("B2C") scenario, or employees of the companies that are customers of the application, as in a business-to-business ("B2B") scenario). The users 129 use the client devices 110 to perform different actions, such as using particular applications of the organization 120, operating on particular resources in those applications 108. For example, in the case of a document sharing application users might create and delete documents and folders and share them with other users. In the case of a social network, users might post pictures and view their friends' pictures. As part of processing device requests, the organization system 120 needs to make decisions about whether the action of a user 129 is authorized (or, more broadly, whether there exists a given relation between two entities, such as a user and an object), which typically happens at an "enforcement point" 125. An enforcement point 125 is a component in a system that enforces authorization decisions, rejecting requests that are not authorized and routing/letting through those that are authorized. The client device 121 of the user makes requests to the organization system and when requests reach the enforcement point 125, the enforcement point makes a request to the multi-tenant system 100 that provides it with authorization-determination services. The authorization module 102 responds to the authorization enforcement point 125 with a determination of whether the action is authorized, and the authorization enforcement point 125 (or other software component that uses it) can then take action in accordance with the authorization determination, such as by allowing the user to proceed to use an application. These aspects are now discussed in additional detail.

The organization 120 is an entity, such as a business, a school, a governmental agency, or the like, that has a number of affiliated users 129, such as employees, consumers or employees of the organization's customers. Although for simplicity FIG. 1 illustrates only a single user 129 and client device 121, there may be any number of either.

The client devices 121 are computing devices such as smart phones, laptop computers, desktop computers, or any other device that can execute or make network requests (e.g. as part of using a browser) to software requiring authorization decisions.

The resources accessed by the users 129 may include resources external to the organization 120 itself. For example, a resource server 130 may provide access to a resource, such as a web-based application (e.g., MICROSOFT OFFICE 365™), a service, a database, a document, or the like.

The organization system 120 may store user data 101 that include a set of identities of known users that are associated with the organization. The user data 101 may include a form of identity on the organization system 120 such as a username, as well as other credential data associated with a user, such as a user password and/or information derived therefrom (such as an encrypted form of the password). The user data 101 may also include many other types of data about users, such as the users' role(s) or group(s) within the organization 120 (e.g., "Engineering", "Legal", "Manager 2", "Director", or the like). Some or all of the user data 101 may additionally or alternatively be stored as part of the relationship tuples 106, described in more detail below.

An organization 120 may have a set of applications 108 that its users can use. The applications 108 may use information about their respective domains to add information to the relationship tuples 106, as described in more detail below.

As noted, the multi-tenant system 100 provides authorization services for the different organizations 120 that are tenants of the system. Since each organization 120 can have its own rules and facts for determining whether a particular action or relationship is authorized for that organization, the multi-tenant system 100 stores a set of organization-specific data for each organization 120 that is a tenant. For example, FIG. 1 illustrates that the multi-tenant system 100 stores authorization models 104 and relationship tuples 106 on behalf of each organization 120 for which it provides authorization services. The authorization model 104 defines the types of objects that can exist within the organization 120 and the types of relationships that those objects can have with users or other objects. The relationship tuples 106 serve as the "facts" that determine (when querying the system) whether a user has a particular relationship to an object based on the authorization model 104. Together, an authorization model 104 and relationship tuples 106 represent a particular domain in which authorization requests can be analyzed. The authorization model 104 and relationship tuples 106 are now described in additional detail.

The authorization model 104 expresses which types of objects can exist within a given tenant/organization system 120, and which types of "relations" those objects can have, as well as which types of relationships imply which other types of relationships; this is defined based on the organization's system. A "relation" is a particular semantic association between two entities within the system, such as ownership, the right to view or print, the right to use, the fact one user "manages" another user, or the like. The entities can represent users 129 of the system, or non-user objects, including collectives such as groups of users or objects.

In one embodiment, the authorization model 104 is specified using a domain-specific language ("DSL"). The DSL defines the types of objects that can be reasoned about by the authorization module 102 for that tenant, and also expresses the types of relations that those types of objects can have with users or other objects. In one embodiment, the DSL expresses which relations are inferred by which other relations using Boolean operators such as "or", "and", and "but not". The primary users for the DSL will be developers working for each organization. For a multi-tenant system, simplifying authorization model development and error minimization is fundamental, as it allows all organizations to define their own authorization models autonomously and with confidence. A DSL with a small surface area (e.g., few keywords) that relies on constructs (boolean operators) with which developers are familiar when defining relations is a key component of making the multi-tenant system 100 valuable Listing 1, below, provides a specific—though purposely simplified—example of expressing a portion of an authorization model 104 using such a DSL:

---
Listing 1
---

```
type doc:
    relations:
        define creator as self
        # all creators can write
        define writer as self or creator
        # all writers can read
        define reader as self or writer or reader from
parent
        # parent folder
        define parent as self
type folder:
    relations:
        define reader as self
```

In this example, the line "type doc:" specifies that "doc" is a type of object (e.g., representing a document) that can exist within the organization's system 120 that is associated with the authorization model 104. The following lines express that the types of relations that a "doc" object can have with a user include "creator", "writer", and "reader" (e.g., respectively expressing whether a particular user is a creator of the document, can write to the document, or can read from the document). The DSL keyword "self" means that users have a relationship to an object if tuples exist that directly imply that relationship. For example, given the line "define creator as self" and the tuple (user: "jane", relation: "creator", object: "doc:roadmap"), Jane, has a relationship "creator" to the "roadmap" document. It is possible to define a relation without self, e.g. define write as edit. This is useful for automatically implied relationships, such as for alias cases. In this example, even if a tuple (user: "john", relation: "write", object: "doc:slides") exists, when querying the system for an authorization decision user John will not have a "write" relationship to doc:slides because only through having an "edit" relationship will users have a "write" relationship. Conceptually, this makes relations that define "self" assignable via tuples. The operator "x from y" refers to the set of users that have relationship x with the object y. In relationship definitions "type t define z as x from y", users will have relationship z with objects of the type if they have relationship x with objects that have relationship y with the object of type t. For example, given the tuples (user: "folder:root", relation: "parent", object: "doc:slides") and (user: "john", relation: "reader", object: "folder:root") and the prior example, the user "john" has a relationship "reader" with object "doc:slides" because: "john" has a relationship "reader" with "folder:root", "folder:root" has a relationship "parent" with "doc:slides" and the type "doc" is defined "define reader as self or writer or reader from parent", so readers of the folder that is parent to the document can read the document.

The relationship tuples 106 represent the "facts" about the user/object relations within the associated organization 120 and form the factual basis for determining whether a given relationship holds. Relationship tuples 106 are (<user>, <relationship>, <object>) triples, representing the fact that the given user has a relation with the given object. For example, one relationship tuple for a particular organization might be (user1234, canUse, applicationABC), indicating that the user with the unique ID "user1234" has a relation-"canUse" with respect to the object with unique identifier "applicationABC" (e.g., that that user is permitted to use that particular application). As another example, another relationship tuple could be (user1234, creator, documentXYZ), indicating that user "user1234" is the creator of the document "documentABC."

In some embodiments, <user> can specify a group of users, such as all members of the "finance" group. The syntax for the <user> tuple component in that case is <object>#<relation>. For example: group:managers#member specifies the set of all users that have a member relationship to the "group:managers" object.

The relationship tuples 106 can be created by software components having knowledge of the domain represented by the authorization model 104 (e.g., the applications 108). Continuing the above example of a domain that includes documents and access thereto, a software component creating (or observing the creation of) a document "$d_1$" for a user "$u_1$" might create the relationship tuple ($u_1$, creator, doc:$d_1$). As another example, a software component observing that user "$u_1$" was added to a group named "accounting" within the organization 120 might create a relationship tuple ($u_1$, member, group:accounting). In this way, the software used by the organization 120 is responsible for creating the relationship tuples 106 that are later used to evaluate authorization requests.

In some embodiments, the DSL includes predefined names (e.g., "$tupleReader", "$tupleWriter") for a relation specifying the ability for users of the organization's system 120 (as opposed to users of the authorization system 100) to read/write tuples to/from the relationship tuples 106 for the user's organization 120. For example, if Listing 1, above, included the line "define $tupleWriter as creator", that would specify that a user $u_2$ is permitted to write tuples related to the documents for which he has a creator relationship (that is, documents d for which the authorization system returns true to a query asking "does $u_2$ have a creator relationship to object d" ($u_1$, creator, d)). In this case, the client device can directly read/write to the multi-tenant system 100 passing an authorization credential that the multi-tenant system will use to determine if $u_2$ has the required permission to perform the action. The benefit for developers of the organization's system is that for certain use cases they do not need a backend component to be developed and maintained and can instead read and write to the multi-tenant system directly. This allows an organization 120 to specify, via its authorization model 104, that users of the organization's system are permitted to write tuples about given objects (e.g., documents) to the relationship tuples 106 if they have a certain specified relation (e.g., "creator") with respect to those objects.

The multi-tenant system 100 has an authorization module 102 that accepts authorization queries originating from users 129 and responds with a determination of whether the relation specified by the query is in fact authorized according to a given authorization model 104 and the relationship tuples 106 for that organization. The authorization queries can be conceptualized as tuples (<authModel>, <user>, <relationship>, <object>), where <user>, <relationship>, and <object> constitute the relation whose authorization is to be determined, and <authModel> represents the authorization model 104 according to which it is determined. The <authModel> is one of the authorization models 104 of the organization 120 to which the querying user 129 belongs.

Continuing the example of Listing 1, a user 129 might use her client device 121 to attempt to write to the document $d_1$. The client device 121 (or within another system with knowledge of the attempt, such as a server on which the document $d_1$ resides, or the authorization enforcement point 125) sends a corresponding authorization query to the authorization module 102 on the multi-tenant system 100. In the prior example, the authorization query might be the tuple ($m_1$, $u_1$, writer, $d_1$), where $m_1$ is one of the authorization models 104 of the organization 120 to which the user 129 belongs, $u_1$ is the unique identifier of the user 129 within the organization 120, "writer" represents the ability to write to a document, and $d_1$ is the document being written to. The exact format and contents of the query could vary in different embodiments. For example, rather than sending the identifier of the authorization model 104, the component sending the authorization query might simply send an identifier of the organization 120 and leave it up to the authorization module 102 to determine which authorization model 104 to use for the that organization.

In order to determine whether a particular <user, relation, object> tuple represents an authorized activity, the authorization module 102 evaluates the sets of users that have a relationship to the object by (recursively) following the definitions of each relation, and considering both boolean operators and user sets, as described above. The response to the query is true if the user is part of the set of users that have a relationship to the object, and false otherwise. Appendix A, below, specifies pseudocode for making this determination, according to some embodiments.

In some embodiments, the multi-tenant system 100 may store multiple authorization models 104 for a single organization 120. For example, there could be separate versions of a single conceptual authorization model, such as a current, stable authorization model used in production, and a newer authorization model that extends, simplifies, or otherwise revises the existing model for different versions, but which is not yet fully tested. In embodiments permitting separate versions of the same conceptual authorization model 104, a model analysis module 103 compares the different versions of the models to determine whether, or in what respects, the versions produce different outcomes. This comparison can be used for purposes such as change management and auditing; performing "what if?" analyses to assess how a particular authorization request will be handled with different models; and/or progressively rolling out changes in authorization policies and evaluating the impact of those changes, rolling the changes back if they result in inaccuracies or other undesirable results.

In some embodiments, the multi-tenant system 100 partitions data (such as the relationship tuples 106) across multiple shards distributed across different servers. Each shard may be assigned one or more predetermined shard keys, each of which is composed of the ID of the particular tenant organization 120, a user type (either a single user or a set of users, as described above), a relation ID, and an object ID. Thus, as part of the recursive resolution discussed above, when the authorization module 102 needs to query relationship tuples from the database, the authorization module computes shardKey=f(tenant, user, relation, object), and all the data for resolving the query can be found in the shard with ID shardKey. This beneficially reduces the time and processing that it takes to find the data to resolve the authorization query, as well as increasing parallelization and overall throughput due to the distribution of the shards across different servers.

The network 140 may be any suitable communications network for data transmission. In an embodiment such as that illustrated in FIG. 1, the network 140 uses standard communications technologies and/or protocols and can include the Internet. In another embodiment, the entities use custom and/or dedicated data communications technologies.

Although the multi-tenant system 100 is illustrated in FIG. 1 as a single entity, it may in practice be composed of multiple server systems, routers, load balancers, and the like. Additionally, in some embodiments the multi-tenant system 100 is composed of servers that are distributed in a number of different geographic zones (e.g., two in North America, three in Europe, 4 in Asia, 2 in Africa, or the like) and the multi-tenant system is configured to route traffic from clients to the closest zone (where "closest" is defined in terms of network speed); this minimizes network latency when communicating with organization's systems 120 in different geographic areas, relative to having a single centralized system, while also increasing availability through redundancy in case of failure of a single region. For scenarios where data location is a concern for privacy and/or compliance reasons, the multi-tenant system can be deployed to specific select geographic zones (e.g. 4 in Europe).

The multi-tenant system 100 can store detailed logs about all operations performed, which organizations can use for various purposes, including audit trails, and exporting for security analysis, among others. Log entries include changes to relationship tuples, changes to authorization models, and each authorization query to verify whether a user has access or not.

Figure 2:
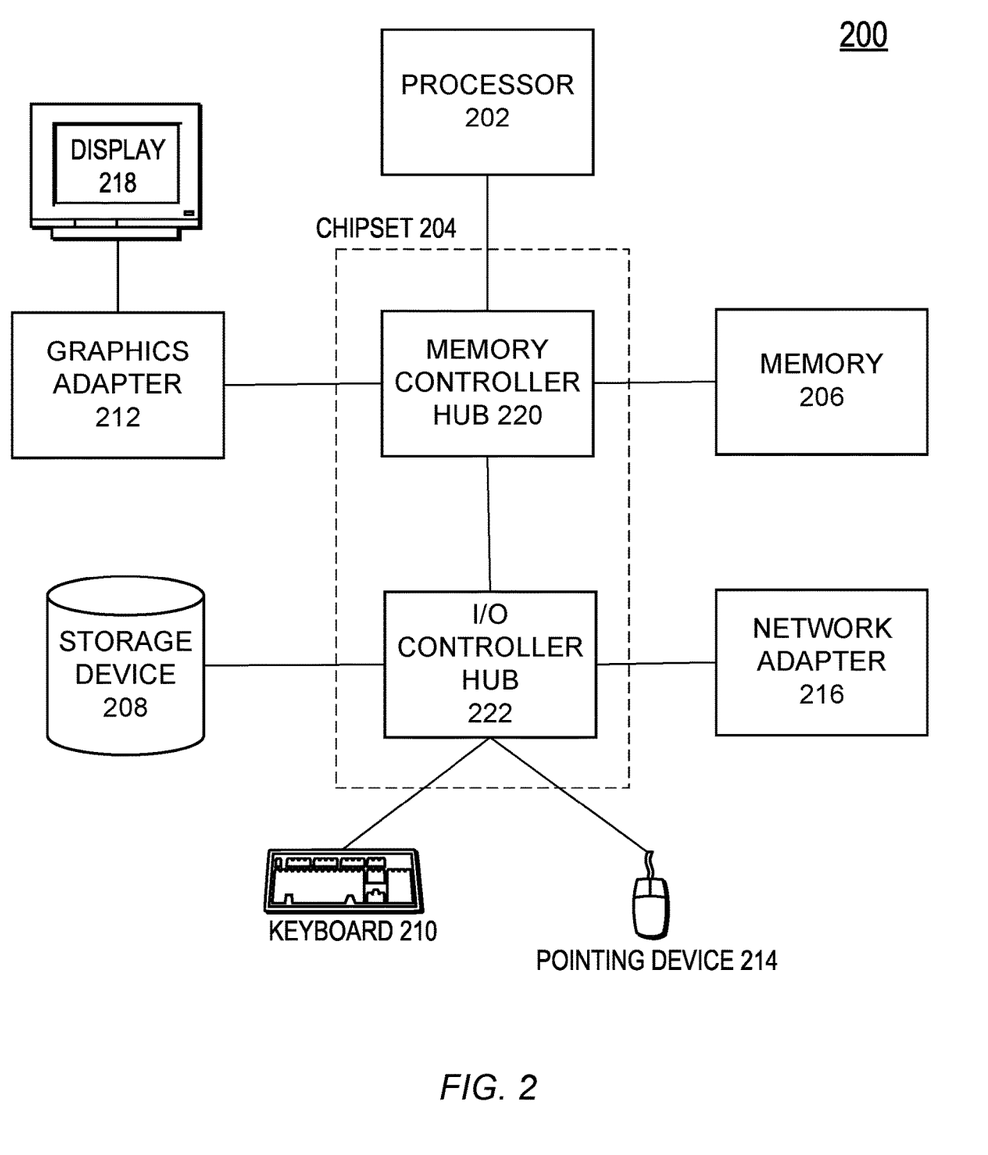
FIG. 2 is a high-level block diagram illustrating physical components of a computer used as part or all of the multi-tenant system, client device, or resource server from FIG. 1, according to one embodiment The figures depict embodiments of the present invention for purposes of illustration only. One skilled in the art will readily recognize from the following description that alternative embodiments of the structures and methods illustrated herein may be employed without departing from the principles of the invention described herein.

FIG. 2 is a high-level block diagram illustrating physical components of a computer 200 used as part or all of the multi-tenant system 100, client device 121, or resource server 130 from FIG. 1, according to one embodiment. Illustrated are at least one processor 202 coupled to a chipset 204. Also coupled to the chipset 204 are a memory 206, a storage device 208, a graphics adapter 212, and a network adapter 216. A display 218 is coupled to the graphics adapter 212. In one embodiment, the functionality of the chipset 204 is provided by a memory controller hub 220 and an I/O controller hub 222. In another embodiment, the memory 206 is coupled directly to the processor 202 instead of the chipset 204.

The storage device 208 is any non-transitory computer-readable storage medium, such as a hard drive, compact disk read-only memory (CD-ROM), DVD, or a solid-state memory device. The memory 206 holds instructions and data used by the processor 202. The graphics adapter 212 displays images and other information on the display 218. The network adapter 216 couples the computer 200 to a local or wide area network. The keyboard 210 and point device 214 allow a user to manually provide input. The audio input (e.g., microphone) 224 and output (e.g., internal or external speaker) 226 provide the ability obtain sound input (e.g., for speech recognition) and produce sound output.

As is known in the art, a computer 200 can have different and/or other components than those shown in FIG. 2. In addition, the computer 200 can lack certain illustrated components. In one embodiment, a computer 200 acting as a server (e.g., a server of the multi-tenant system 100) may lack a graphics adapter 212, and/or display 218, as well as a keyboard 210, pointing device 214, and/or audio input 224 and output 226. Moreover, the storage device 208 can be local and/or remote from the computer 200 (such as embodied within a storage area network (SAN)).

As is known in the art, the computer 200 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 208, loaded into the memory 206, and executed by the processor 202.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

OTHER CONSIDERATIONS

One possible embodiment has been described herein. Those of skill in the art will appreciate that other embodiments may likewise be practiced. First, the particular naming of the components and variables, capitalization of terms, the attributes, data structures, or any other programming or structural aspect is not mandatory or significant, and the mechanisms described may have different names, formats, or protocols. Also, the particular division of functionality between the various system components described herein is merely for purposes of example, and is not mandatory; functions performed by a single system component may instead be performed by multiple components, and functions performed by multiple components may instead be performed by a single component.

Some portions of the above description present the inventive features in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects described herein include process steps and instructions in the form of an algorithm. It should be noted that the process steps and instructions could be embodied in software, firmware or hardware, and when embodied in software, could be downloaded to reside on and be operated from different platforms used by real time network operating systems.

The concepts described herein also relate to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the concepts described herein are not described with reference to any particular programming language. It is appreciated that a variety of programming languages may be used to implement the teachings as described herein, and any references to specific languages are provided for purposes of enablement and best mode.

The concepts described herein are well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure is intended to be illustrative, but not limiting, of the scope of the concepts described herein, which are set forth in the below claims.

APPENDIX A

The below pseudocode function "check" returns true if given a tuple (u,r,o), the user u has a relationship r to the object o (i.e., if the user belongs to the set of users that have that relationship), and false otherwise. Clients are instructed to interpret true as the user being authorized to perform operations that the relationship grants permission to on the object, false as not authorized.

Boolean operators in the DSL are translated to set theory operators before analyzing the query.

"define x as a or b" means: a user has a relationship x to an object of the type if the user belongs to the set of users that are part of the "union" of sets a and b, where a and b are the set of users that have relationship a/b with the object of the type.

"define x as a and b" means: a user has a relationship x to an object of the type if the user belongs to the set of users that are part of the "intersection" of sets a and b, where a and b are the set of users that have relationship a/b with the object of the type.

"define x as a but not b" means: a user has a relationship x to an object of the type if the user belongs to the set of users that are part of the "difference" of sets a and b, where a and b are the set of users that have relationship a/b with the object of the type.

The "x from y" operator is handled internally as a "tuple to userset" case.

```
function check (tuple) {
    namespace = getNamespaceFromTuple(tuple)
    namespaceConfig = getNamespaceConfiguration(namespace)
    return resolveNamespaceConfig(tuple, namespaceConfig)
}
function resolveNamespaceConfig(tuple, namespaceConfig) {
    allowed = false
    if (namespaceConfig == "self") allowed = solveDirect(tuple)
    else if (namespaceConfig == "computed") allowed = solveComputed(tuple, namespaceConfig)
    else if (namespaceConfig == "union") allowed = solveUnion(tuple, namespaceConfig)
    ... (intersection, difference, tuple to userset)
    return allowed
}
function findTuplesInDB(tuple) {
    # Takes a tuple that has at least object and relation
    # User is optional
    # Returns list of Tuples that match the search criteria
}
function solveDirect(tuple) {
    exists = findTuplesInDB(tuple)
    if (exists) return true
    relatedTuples = findTuplesInDB({ object: tuple.object, relation: tuple.relation })
    for relatedTuple in relatedTuples {
        object, relation = getObjectAndRelation(relatedTuple)
        newTuple = { object: object, relation: relation, user: tuple.user }
        allowed = check(newTuple)
        if (allowed) return true
    }
    return false
}
function solveComputed(tuple, namespaceConfig) {
    newTuple = { object: tuple.object, relation: namespaceConfig.computedRelation, user: tuple.user }
    return check(newTuple)
}
function solveUnion(tuple, namespaceConfig) {
    for config in namespaceConfig {
        allowed = resolveNamespaceConfig(tuple, config)
        if (allowed) return true
    }
    return false
}
```

The below provides a grammar for one embodiment of the DSL, including the keywords "type", "relations", "define", "self", "as", "or", "and", "from", and "but not":

```
types               -> (_newline):* (type relations (define_or |
define_and | define_but_not | define_base):*):*
type                -> (_comment):* _type _naming (_newline):+
relations           -> (_comment):* _relations (_newline):+
define_or           -> (_comment):* (define_raw (_or):+)
                       (_newline):*
define_and          -> (_comment):* (define_raw (_and):+)
                       (_newline):*
define_but_not      -> (_comment):* (define_raw (_but_not):+)
                       (_newline):*
define_base         -> (_comment):* define_raw (_newline):*
define_raw          -> _define _naming _spacing _as
                       (_naming | _from)
_as                 -> "as" _spacing
_or                 -> "or" _spacing (_naming | _from)
_and                -> "and" _spacing (_naming | _from)
_but_not            -> "but not" _spacing (_naming | _from)
_self               -> "self" _spacing
_from               -> _naming _spacing "from" _spacing _naming
_define             -> " define" _spacing
_relations          -> " relations" " ":*
_type               -> "type" _spacing
_naming             -> (("$"):? ( [a-z] | [A-Z] | [0-9] | "_" | "-" ):+)
                       " ":*
_comment            -> " ":* "#" _spacing [\w]:* " ":* _newline
_optional_space     -> " ":*
_spacing            -> " ":+
_newline            -> _optional_space "\n"
```

What is claimed is:

1. A computer-implemented method for user authorization in a cloud-based multi-tenant system, comprising:
    receiving, from an administrator of a first tenant of the cloud-based multi-tenant system, an authorization model indicating types of objects of the first tenant, and types of relations that those types of objects have with users of the first tenant, the authorization model being expressed with a declarative domain-specific language using Boolean disjunction operators;
    receiving relationship tuples indicating respective relations between respective users and respective objects;
    receiving a request to determine whether a first user of the first tenant is authorized to perform a first action on a first object;
    making a determination of whether the first user is authorized using inferences from the authorization model and the relationship tuples and using the relations and the Boolean disjunction operators of the authorization model received from the administrator;
    responding to the request with the determination of whether the first user is authorized;
    receiving a revised authorization model different from the authorization model;
    storing the authorization model and the revised authorization model;
    obtaining, using the authorization model, a first outcome of a first authorization request;
    obtaining, using the revised authorization model, a second outcome of the first authorization request; and
    comparing the first outcome of the authorization model and the second outcome of the revised authorization model to identify discrepancies between outcomes of the authorization model and the revised authorization model.

2. The computer-implemented method of claim 1, wherein the received authorization model comprises a rule permitting the users having a respective relationship to an object to add, remove, or both, to the relationship tuples, a relationship tuple referencing the object or to read relationship tuples referencing the object.

3. The computer-implemented method of claim 1, wherein the relationship tuples are received, from software components designed to operate with the cloud-based multi-tenant system, in response to actions associated with the users of the first tenant.

4. The computer-implemented method of claim 1, further comprising logging, in persistent storage, the request and a response to the request that indicates the determination of whether the first user is authorized.

5. A computer-readable storage medium storing instructions that when executed by a computer processor perform actions comprising:
    receiving, from an administrator of a first tenant of a cloud-based multi-tenant system, an authorization model indicating types of objects of the first tenant, and types of relations that those types of objects have with users of the first tenant, the authorization model being expressed with a declarative domain-specific language using Boolean disjunction operators;
    receiving relationship tuples indicating respective relations between respective users and respective objects;
    receiving a request to determine whether a first user of the first tenant is authorized to perform a first action on a first object;
    making a determination of whether the first user is authorized using inferences from the authorization model and the relationship tuples and using the relations and the Boolean disjunction operators of the authorization model received from the administrator;
    responding to the request with the determination of whether the first user is authorized;
    receiving a revised authorization model different from the authorization model;
    storing the authorization model and the revised authorization model;
    obtaining, using the authorization model, a first outcome of a first authorization request;
    obtaining, using the revised authorization model, a second outcome of the first authorization request; and
    comparing the first outcome of the authorization model and the second outcome of the revised authorization model to identify discrepancies between outcomes of the authorization model and the revised authorization model.

6. The computer-readable storage medium of claim 5, wherein the received authorization model comprises a rule permitting the users having a respective relationship to an object to add, remove, or both, to the relationship tuples, a relationship tuple referencing the object or to read relationship tuples referencing the object.

7. The computer-readable storage medium of claim 5, wherein the relationship tuples are received, from software components designed to operate with the cloud-based multi-tenant system, in response to actions associated with the users of the first tenant.

8. The computer-readable storage medium of claim 5, the actions further comprising logging, in persistent storage, the request and a response to the request that indicates the determination of whether the first user is authorized.

9. A multi-tenant computer system comprising:
    a computer processor; and
    a computer-readable storage medium storing instructions that when executed by the computer processor perform actions comprising:
        receiving, from an administrator of a first tenant of a cloud-based multi-tenant system, an authorization model indicating types of objects of the first tenant, and types of relations that those types of objects have with users of the first tenant, the authorization model being expressed with a declarative domain-specific language using Boolean disjunction operators;

receiving relationship tuples indicating respective relations between respective users and respective objects;

receiving a request to determine whether a first user of the first tenant is authorized to perform a first action on a first object;

making a determination of whether the first user is authorized using inferences from the authorization model and the relationship tuples and using the relations and the Boolean disjunction operators of the authorization model received from the administrator;

responding to the request with the determination of whether the first user is authorized;

receiving a revised authorization model different from the authorization model;

storing the authorization model and the revised authorization model;

obtaining, using the authorization model, a first outcome of a first authorization request;

obtaining, using the revised authorization model, a second outcome of the first authorization request; and comparing the first outcome of the authorization model and the second outcome of the revised authorization model to identify discrepancies between outcomes of the authorization model and the revised authorization model.

10. The multi-tenant computer system of claim 9, wherein the received authorization model comprises a rule permitting the users having a respective relationship to an object to add, remove, or both, to the relationship tuples, a relationship tuple referencing the object or to read relationship tuples referencing the object.

11. The multi-tenant computer system of claim 9, wherein the relationship tuples are received, from software components designed to operate with the cloud-based multi-tenant system, in response to actions associated with the users of the first tenant.

12. The multi-tenant computer system of claim 9, the actions further comprising logging, in persistent storage, the request and a response to the request that indicates the determination of whether the first user is authorized.

* * * * *